United States Patent
Beineke et al.

(10) Patent No.: US 10,852,822 B2
(45) Date of Patent: Dec. 1, 2020

(54) DISPLAY METHOD

(71) Applicant: Aptiv Technologies Limited, St. Michael (BB)

(72) Inventors: Heather L. Beineke, Westfield, IN (US); Douglas A. Srail, Kokomo, IN (US); Mark A. Kady, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/400,244

(22) Filed: May 1, 2019

(65) Prior Publication Data
US 2020/0348751 A1 Nov. 5, 2020

(51) Int. Cl.
| | |
|---|---|
| *G06F 3/01* | (2006.01) |
| *G09G 5/38* | (2006.01) |
| *G06F 3/14* | (2006.01) |
| *B60K 35/00* | (2006.01) |

(52) U.S. Cl.
CPC .............. *G06F 3/013* (2013.01); *B60K 35/00* (2013.01); *G06F 3/1423* (2013.01); *G09G 5/38* (2013.01); *B60K 2370/176* (2019.05); *B60K 2370/193* (2019.05); *B60K 2370/52* (2019.05); *G09G 2340/045* (2013.01); *G09G 2340/0464* (2013.01); *G09G 2354/00* (2013.01); *G09G 2380/10* (2013.01)

(58) Field of Classification Search
CPC combination set(s) only.
See application file for complete search history.

(56) References Cited

U.S. PATENT DOCUMENTS

| | | |
|---|---|---|
| 4,973,149 A | 11/1990 | Hutchinson |
| 9,841,813 B2 | 12/2017 | Srail |
| 2007/0279590 A1 | 12/2007 | Ebisawa |
| 2009/0022368 A1 | 1/2009 | Matsuoka et al. |
| 2012/0200406 A1 | 8/2012 | Morris |
| 2013/0342672 A1 | 12/2013 | Gray et al. |
| 2015/0084764 A1* | 3/2015 | Wunsche .................. B60R 1/12 340/462 |

(Continued)

FOREIGN PATENT DOCUMENTS

| | | |
|---|---|---|
| GB | 2566611 | 3/2019 |
| WO | 8603863 A1 | 7/1986 |

OTHER PUBLICATIONS

Eye Gaze Tracking Using an RGBD Camera: A Comparison with an RGB Solution, Xuehan Xiong, UbiComp 2014 Sep. 13-17, 2014, Seattle WA, USA.

(Continued)

*Primary Examiner* — Robin J Mishler
(74) *Attorney, Agent, or Firm* — Colby Nipper PLLC (57) ABSTRACT

A method includes detecting, with a sensor, a gaze of an occupant of a vehicle. The gaze is directed to at least one vehicle displays. The method also includes determining, with a controller circuit in communication with the sensor, whether one or more features presented on the at vehicle displays are partially obstructed from a view of the occupant. When the one or more features presented on vehicle displays are partially obstructed from the view of the occupant, the controller circuit adjusts a presentation of at least one partially obstructed features to be viewable by the occupant.

20 Claims, 5 Drawing Sheets

(56) References Cited

U.S. PATENT DOCUMENTS

2015/0234459 A1    8/2015  George-Svahn et al.
2017/0291493 A1*  10/2017  Bostick .................... B60Q 9/00
2020/0012342 A1    1/2020  Hassani et al.

OTHER PUBLICATIONS

In the Eye of the Beholder: A Survey of Models for Eyes and Gaze, Dan Witzner Hansen, IEEE Transactions on Pattern Analysis and Machine Intelligence, vol. 32, No. 3, Mar. 2010.
"Partial European Search Report", EP Application No. 20167270.6, dated Sep. 14, 2020, 11 pages.

* cited by examiner

DISPLAY METHOD

TECHNICAL FIELD OF INVENTION

This disclosure generally relates to a method of displaying features on a vehicle display.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
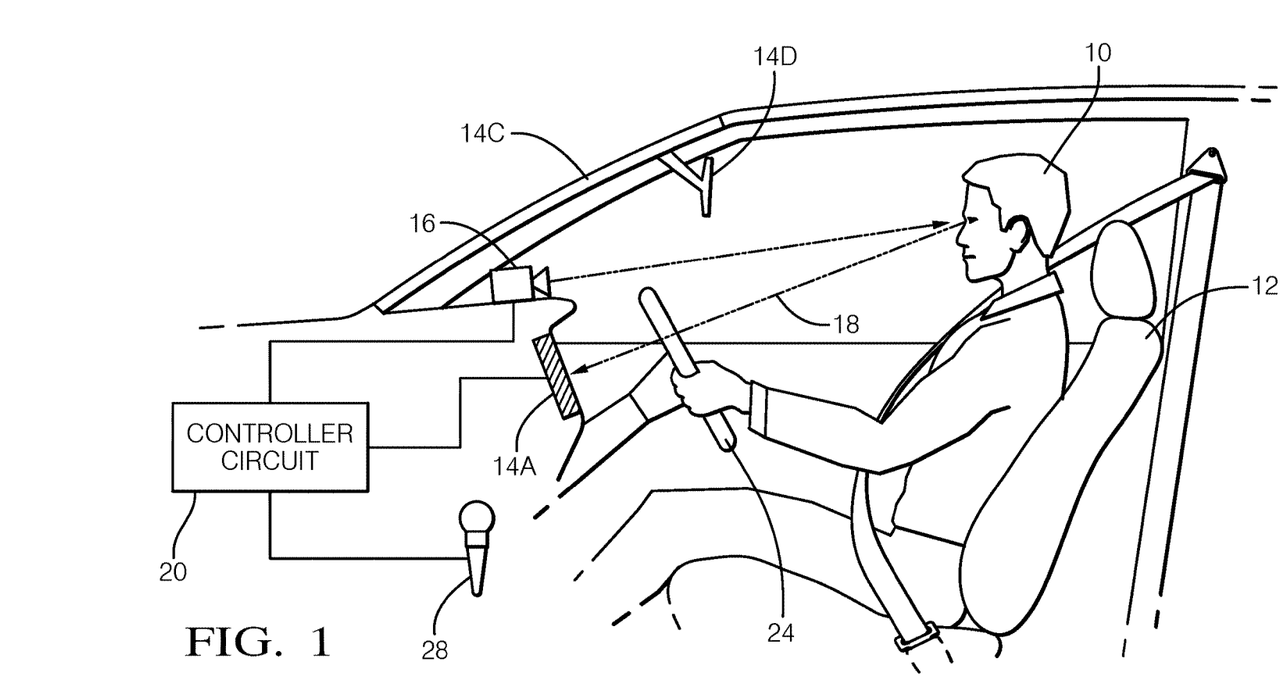
FIG. 1 is an illustration an occupant of a vehicle viewing at a vehicle display in accordance with one embodiment.

FIG. 1 is an illustration of an occupant 10 of a vehicle seated in a driver's seat 12 of the vehicle. The occupant 10 is viewing at least one vehicle displays 14 (i.e., 14A-14D) located in a passenger compartment of the vehicle. A sensor 16 (e.g. a camera) is located in the passenger compartment and detects a direction of a gaze 18 (i.e. a gaze direction, glance direction, line of sight, etc.), hereafter referred to as a gaze 18 of the occupant 10. A controller circuit 20 is communicatively coupled to the at least one vehicle displays 14 and the sensor 16. The controller circuit 20 is configured to determine whether the gaze 18 of the occupant 10 is directed to specific features 22 displayed on the vehicle displays 14 based on a gaze tracking routine that operates in the controller circuit 20. The gaze tracking routine may be any of the known feature-based gaze tracking routines that estimate the gaze 18 based on eye features, such as eye contours, eye corners, and reflections of light from the eye. In an example, the gaze 18 is detected by a camera based on reflections of the light waves from a cornea of the eye, referred to as glint, and by detecting the position of the pupil of the eye. A geometric spherical model of the eye may be stored in the memory of the controller circuit 20 that enables the computation of the gaze 18 based on the detected glint and position of the pupil. One example of a gaze detection system is disclosed in U.S. Pat. No. 9,841,813 B2, AUTOMATED VEHICLE HUMAN-MACHINE INTERFACE SYSTEM BASED ON GLANCE-DIRECTION, which is hereby incorporated in its entirety by reference.

In the example illustrated in FIG. 1, the sensor 16 is a camera configured to capture images of the occupant 10 using light waves in the infrared (IR) and/or a near-IR spectrum from one or more IR sources (e.g., IR light emitting diodes (LEDs)—not shown). The IR LEDs may be installed near the camera to illuminate a face of the occupant 10, even during hours of low ambient light (e.g. nighttime). In another example the sensor 16 is a camera configured to capture images of the occupant 10 using light waves in the visible spectrum. In another example, the sensor 16 includes multiple cameras (either IR or visible light cameras) positioned at different locations within the passenger compartment with a view of the occupant 10.

The controller circuit 20 may include a processor (not shown) such as a microprocessor or other control circuitry such as analog and/or digital control circuitry. The control circuitry may include one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. The controller circuit 20 may also combine custom hard-wired logic, ASICs, or FPGAs with custom programming to accomplish the techniques. The controller circuit 20 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying special programming signals. The controller circuit 20 may include other examples of non-volatile memory, such as flash memory, read-only memory (ROM), programmable read-only memory (PROM), and erasable programmable read-only memory (EPROM). The controller circuit 20 may include volatile memory, such as dynamic random-access memory (DRAM), static random-access memory (SRAM). The one or more routines may be executed by the processor to perform steps for detecting the gaze 18 of the occupant 10 based on signals received by the controller circuit 20 from the sensor 16 as described herein.

Figure 2:
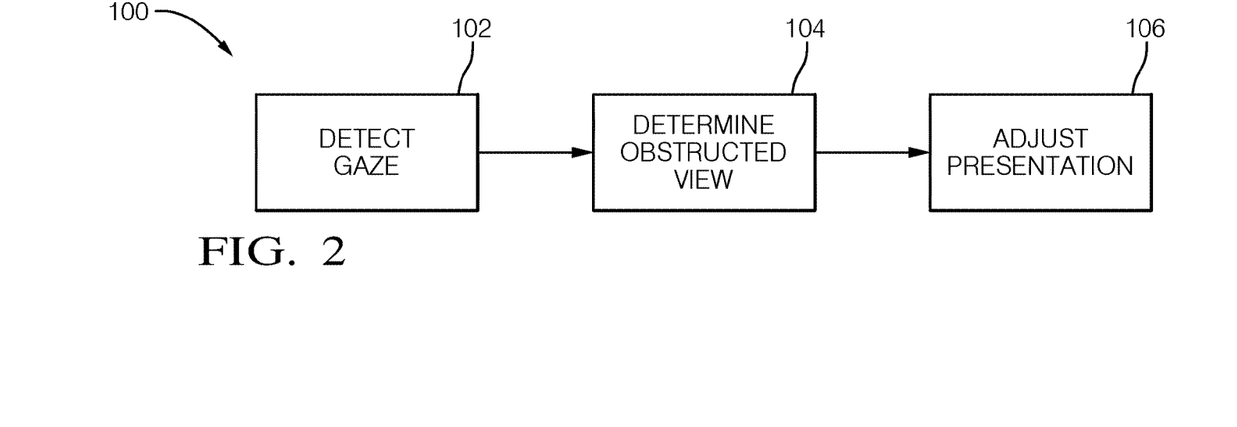
FIG. 2 is a flow chart illustrating a method of displaying features on the vehicle display of FIG. 1 in accordance with one embodiment.

FIG. 2 is a flow chart illustrating an example of a method 100 of displaying features 22 on vehicle displays 14 using the system shown in FIG. 1. The method 100, as will be described in more detail below, may provide various improvements over other methods.

Step 102, DETECT GAZE, includes detecting, with the sensor 16, the gaze 18 of the occupant 10 of the vehicle, where the gaze 18 is directed to the at least one vehicle displays 14. In an example, the at least one vehicle displays 14 are an instrument display 14A. In another example, the at least one vehicle displays 14 are a console display 14B of the vehicle. In another example, the at least one vehicle displays 14 are located on a dashboard. In another example the at least one vehicle displays 14 are a continuous display that spans the entire dashboard. In another example, the at least one vehicle displays 14 are located on a windshield 14C. In another example, the at least one vehicle displays 14 are located on a side window (not specifically shown). In another example, the at least one vehicle displays 14 are located on a mirror 14D (e.g., a rear-view mirror and/or side-view mirrors).

Referring back to FIG. 1, the camera captures a sequence of images over time, which include the eyes and head of the occupant 10, to be processed by the controller circuit 20. In an example, the sequence of images are captured by the camera at a frame rate of between 10 frames per second (10 fps) and 60 fps. It will be appreciated that an increased frame rate will capture an increased number of images of the eyes and head for processing by the controller circuit 20. The images indicate a position of the eyes and head, and the sequence of images determine a pause interval where the eyes remain in generally the same position (within an allowable tolerance of about 2 degrees) for a defined duration of time. That is, the controller circuit 20 determines the pause interval by comparing the position of the eyes in each subsequent image (i.e., frames) captured by the camera. For example, the camera having the frame rate of 10 fps, that captures two consecutive frames of the operator's 10 eyes in the same position, would yield the pause interval detected by the controller circuit 20 of 0.2 seconds (i.e., 200 milliseconds (200 ms)). The controller circuit 20 then determines the gaze 18 associated with each pause interval and stores the gaze 18 in the memory. That is, the controller-circuit determines where the occupant 10 is looking during each pause interval and stores this information for later use. The pause interval may be any duration of time and, in an example, the pause interval of about 200 ms is sufficiently long to determine that the occupant 10 is gazing at a particular feature 22. In an example, the pause interval is a fixed period of time. In another example, the pause interval is a variable period of time and varies based on the number of features 22 being displayed on the particular vehicle display 14. In this example, the vehicle display 14 having a relatively large number of features 22 may enable a longer pause interval, compared to the vehicle display 14 having fewer features 22 displayed, to allow the occupant 10 sufficient time to search and find the particular feature 22 of interest.

Figure 3:
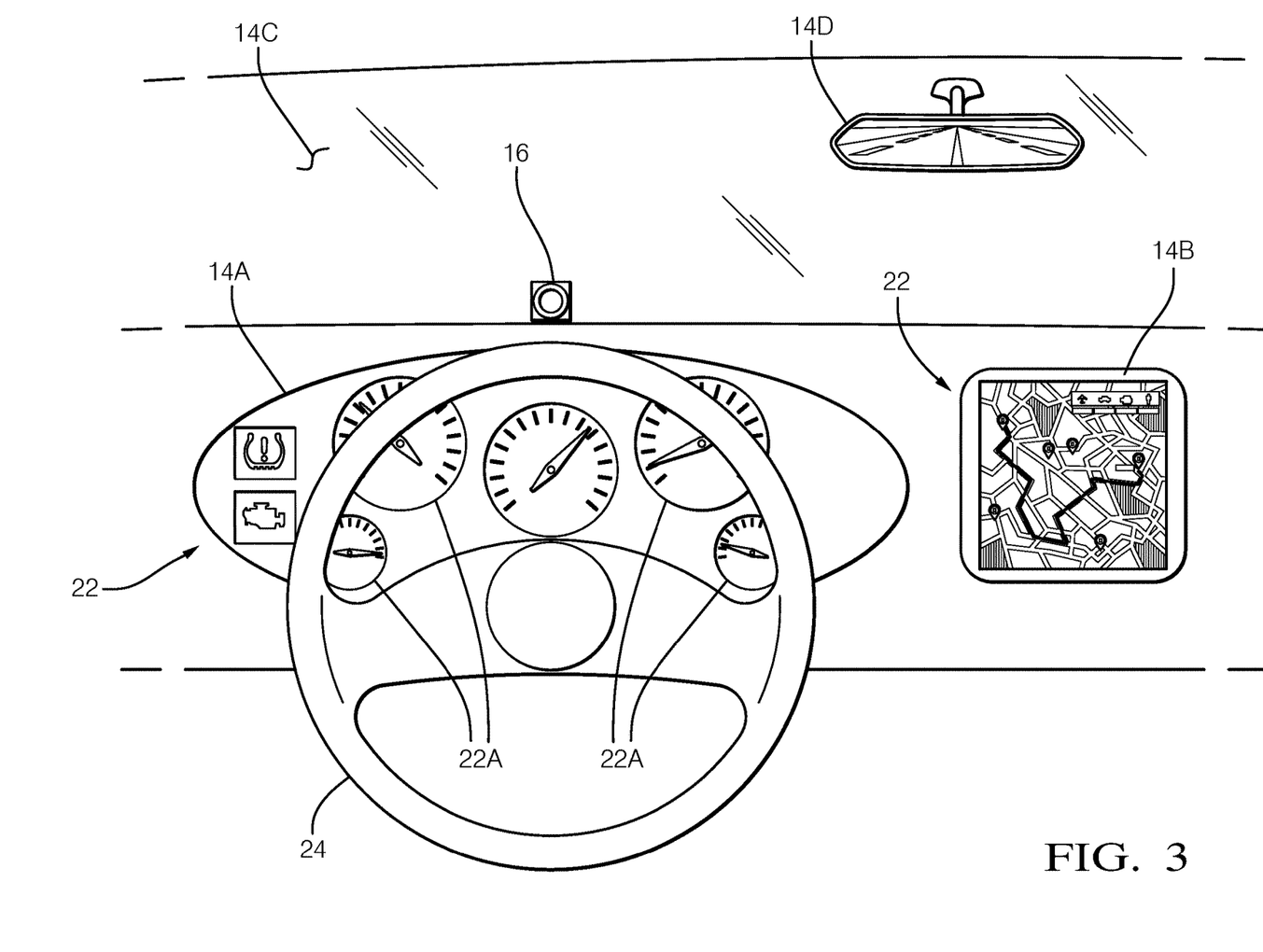
FIG. 3 is an illustration of a forward view of the occupant of FIG. 1 in accordance with one embodiment.

Step 104, DETERMINE OBSTRUCTED VIEW, includes determining, with the controller circuit 20, whether one or more features 22 presented on the at least one vehicle displays 14 are at least partially obstructed from the view of the occupant 10 (i.e. partially obstructed features 22A). FIG. 3 illustrates a forward facing view from the perspective of the occupant 10 sitting in the driver's seat 12. In this example, due to the occupants' 10 seating position, the steering wheel position, the steering wheel dimensions, and the occupants' 10 physical characteristics (e.g. height, head position, etc.), one or more of the features 22 on the vehicle displays 14 may be at least partially obstructed from the view. In this example, the features 22 are digital gages on the instrument display 14A that may indicate various operating conditions of subsystems of the vehicle. In another example, the features 22 are icons that may provide information to the occupant 10, such as warnings related to the vehicle subsystems. In another example, the features 22 are infotainment features, such as a map, showing navigation information. In another example, the features 22 are a camera image, such as those from a rear camera and/or other vehicle mounted cameras. As shown in the example illustrated in FIG. 3, several digital gages are at least partially obstructed from the view of the occupant 10 by the steering wheel 24, and the navigation information is shown on the console display 14B to a right side of the steering wheel 24. In this example, a layout or arrangement of the digital gages and navigation information displayed on the instrument display 14A and console display 14B are stored in the memory of the controller circuit 20. In addition, the steering wheel position, and the steering wheel dimensions are also stored in the memory of the controller circuit 20. The layout indicates the pixel positions on the vehicle displays 14 that correspond to the individual features 22. The steering wheel position includes a tilt angle, a rotational angle of the steering wheel 24, and an extension length of a steering column. The layout and the steering wheel position are known relative to a vehicle coordinate system that, in an example, originates at a front and center of the vehicle, such as at a center point of a front bumper.

The controller circuit 20 uses a geometrical relationship between the gaze 18, the layout, the steering wheel position, and the position of the eyes and head, to determine which features 22 are partially obstructed features 22A on the instrument display 14A. That is, the controller circuit 20 determines the occupants' 10 line of sight, and compares the line of sight to the known positions of the steering wheel 24 and the features 22 on the instrument display 14A. Any features 22 that are determined to be blocked by the steering wheel 24, along the line of sight, are considered partially obstructed features 22A.

Figure 4:
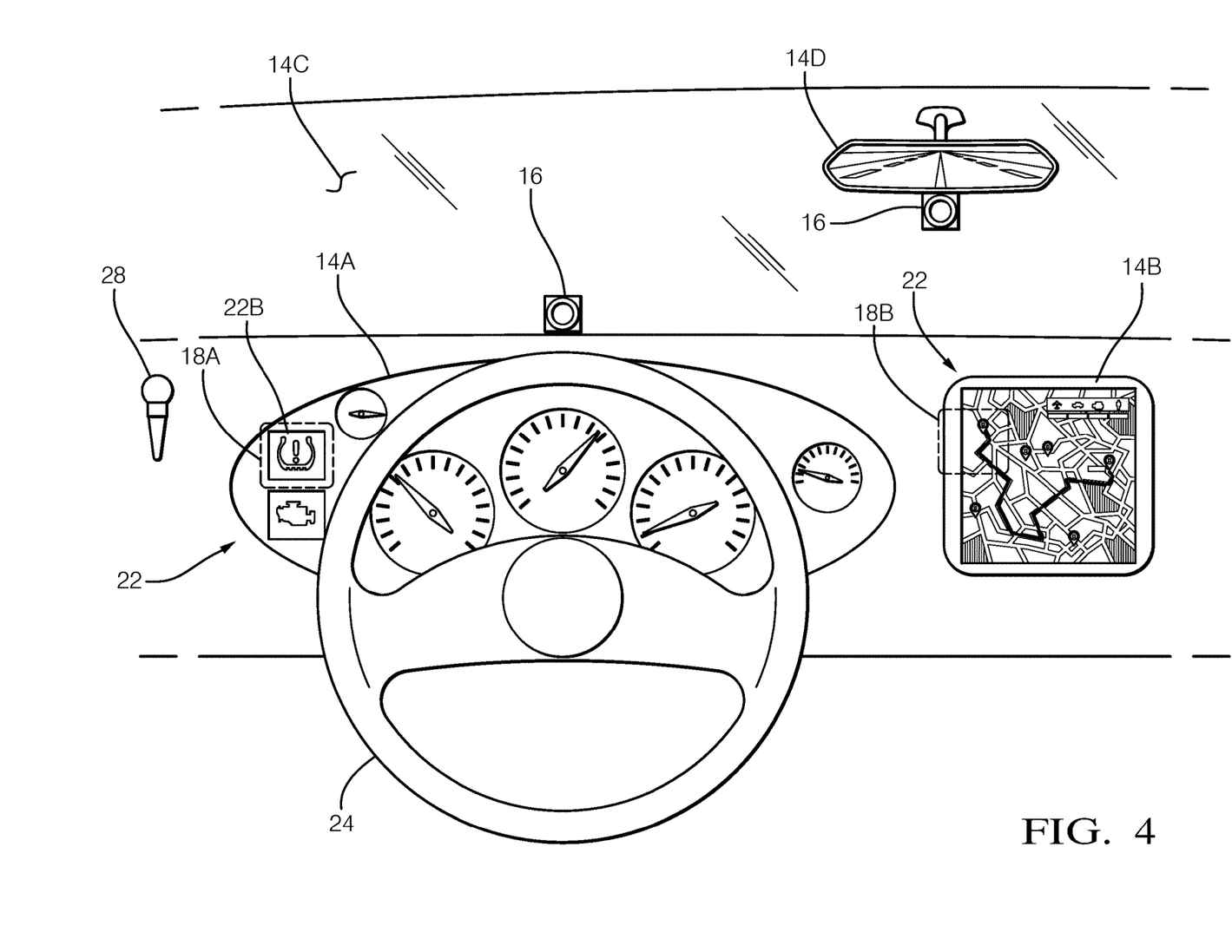
FIG. 4 is an illustration of another forward view of the occupant of FIG. 1 in accordance with one embodiment.

Step 106, ADJUST PRESENTATION, includes adjusting, with the controller circuit 20, a presentation of at least one partially obstructed features 22A to be viewable by the occupant 10. FIG. 4 illustrates the vehicle displays 14 of FIG. 3 after the presentation of the partially obstructed features 22A is adjusted to be viewable by the occupant 10. In this example, the positions of the partially obstructed features 22A (e.g. the four of the digital gages) are adjusted such that the steering wheel 24 is no longer obstructing the occupants' 10 view of the digital gages. Specifically, the two larger diameter digital gages are moved lower on the instrument display 14A compared to their original positions (see FIG. 3), and the two smaller digital gages are moved upward and outboard of the steering wheel 24 from their original positions. In addition, a dimension of one of the smaller diameter digital gages (shown on a left side of the instrument display 14A) is adjusted such that a size of the digital gage is reduced. In an example, the position of all the features 22 on the instrument display 14A are adjusted such that none of the features 22 are obstructed from view. In another example, the dimension of all the features 22 presented on the instrument display 14A are adjusted such that none of the features 22 are obstructed from view.

In another example, the controller circuit 20 may move any one of the partially obstructed features 22A to another one of the vehicle displays 14, such as to the console display 14B, or the windshield 14C projected by a heads-up display device. In this example, the controller circuit 20 may arbitrarily determine the location and the particular vehicle display 14 in which to move the partially obstructed features 22A. In another example described below, the occupant 10 determines the location and the particular vehicle display 14 in which to move the partially obstructed features 22A.

In an example, the controller circuit 20 stores the adjusted presentation of the vehicle displays 14 in the memory and may recall the adjusted presentation upon each occurrence of vehicle usage, enabling the occupant 10 to customize the vehicle displays 14 to their own liking. In another example, the adjusted presentation may be recalled from the memory of the controller circuit 20 by the occupant 10 when entering the vehicle (e.g., activated by an automatic seat adjustment routine that may be associated with a particular occupant 10). In another example the controller circuit 20 defaults to a factory installed display upon each occurrence of vehicle usage.

Figure 6:
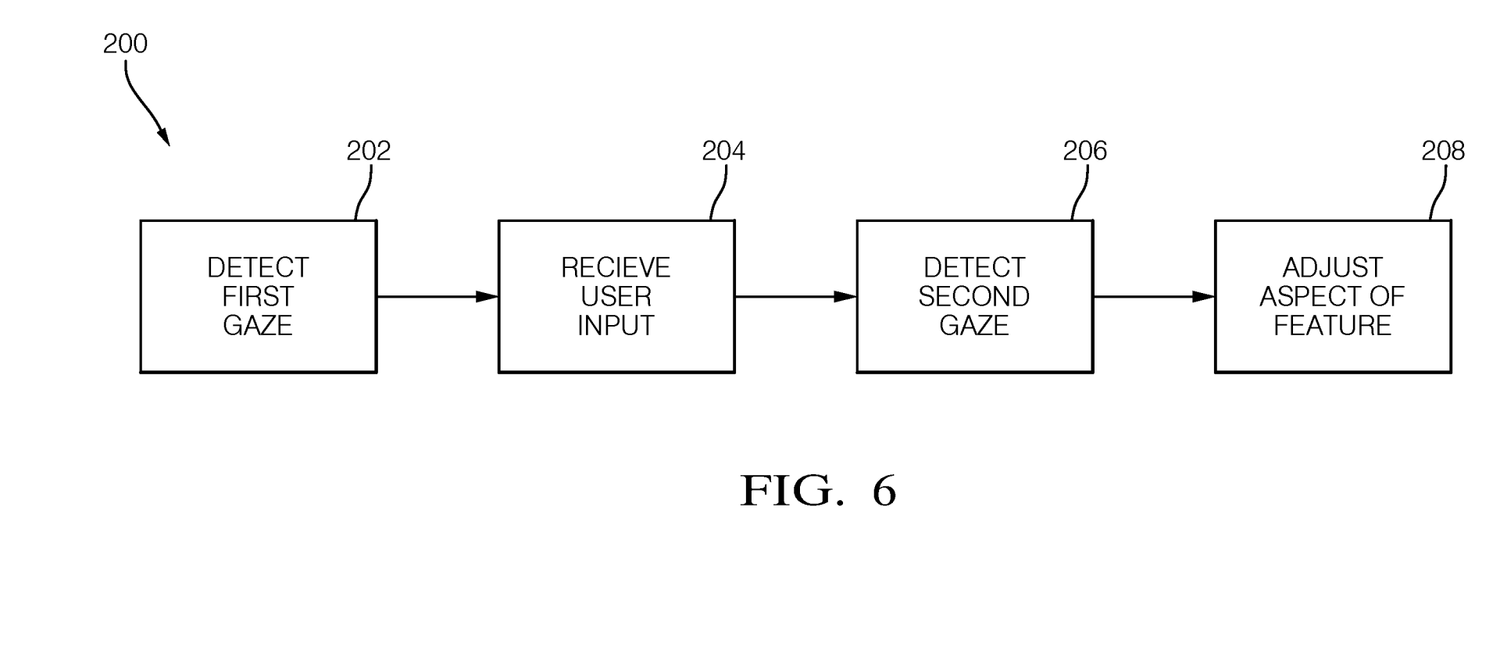
FIG. 6 is a flow chart illustrating another method of displaying features on the vehicle display of FIG. 1 in accordance with another embodiment.

FIG. 6 is a flow chart illustrating another example of a method 200 of displaying features 22 on one or more vehicle displays 14, where the occupant 10 determines the location and the particular vehicle display 14 in which to move the features 22. The method 200 uses the same system components shown in FIG. 1 and described above for method 100.

Step 202, DETECT FIRST GAZE, includes detecting, with the sensor 16, a first gaze 18A directed to at least one feature 22 presented on the one or more vehicle displays 14. Referring back to the example illustrated in FIG. 4, the first gaze 18A is directed to a tire pressure warning icon on the instrument display 14A at the left side of the steering wheel 24. For the purposes of illustration, a dashed line surrounding the icon is used to show the object of interest, and it will be understood that the dashed line is not visible to the occupant 10. The first gaze 18A is determined when the pause interval is detected by the controller circuit 20 based on the sequence of images captured by the camera, as described above. The controller circuit 20 indicates to the occupant 10 that the occupant 10 has selected the feature 22 (i.e. the selected feature 22B) based on the first gaze 18A. In the example illustrated in FIG. 4, the controller circuit 20 determines the selected feature 22B based on the layout of the instrument display 14A stored in the memory that is in the line of sight. In an example, the controller circuit 20 indicates the selected feature 22B by highlighting a border of the selected feature 22B. In another example, the controller circuit 20 indicates the selected feature 22B by pulsing a brightness of the selected feature 22B. In yet another example, the controller circuit 20 indicates the selected feature 22B by enlarging and reducing (i.e., pulsing) a size of the selected feature 22B. In yet another example, the controller circuit 20 indicates the selected feature 22B by an audible message delivered through a speaker, such as through an audio system of the vehicle. It will be appreciated that the controller circuit 20 may indicate the selected feature 22B by any combination of the above mentioned indications.

In an example, the controller circuit 20 may be configured to disable the indication of the selected feature 22B when the occupant 10 may not intend to adjust the vehicle displays 14. In this example, a selector switch in communication with the controller circuit 20 (e.g., a button on the steering wheel 24 or the vehicle displays 14—not shown) may be used to activate and/or deactivate the indication of the selected feature 22B.

Figure 5:
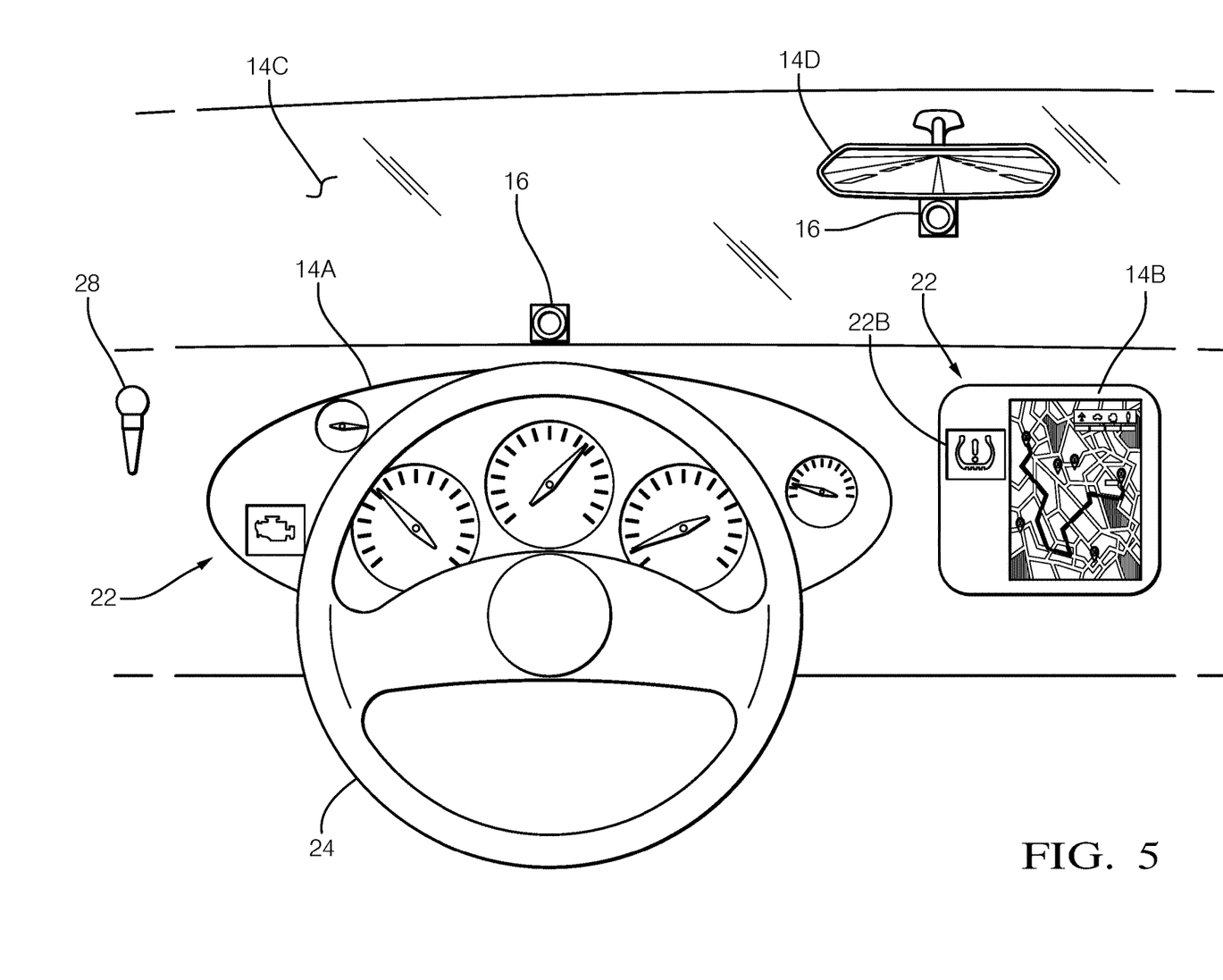
FIG. 5 is an illustration of another forward view of the occupant of FIG. 1 in accordance with another embodiment.

Step 204, RECEIVE USER INPUT, includes receiving, with an input device 28 in communication with the controller circuit 20, a user input indicating that the user (e.g., the occupant 10) seeks to modify at least one aspect associated with the selected feature 22B. In an example, the one aspect includes a dimension of the selected feature 22B. In another example, the one aspect includes a color of the selected feature 22B. In another example, the one aspect includes a contrast of the selected feature 22B relative to a background of the vehicle display 14. In another example, the one aspect includes a perceived depth of the selected feature 22B. In another example, the one aspect includes a font of the selected feature 22B. In another example, the one aspect includes a brightness of the selected feature 22B. In the examples illustrated in FIGS. 4-5, the at least one aspect is the position of the selected feature 22B on the one or more vehicle displays 14. It will be appreciated that the method 200 may be applied to other aspects of the features 22 as described above.

In an example, the input device 28 is a gesture recognition device that recognizes a gesture indicative of the desired command. In this example, the occupant 10 may use a finger swipe and/or a hand wave to indicate the desire to move the selected feature 22B. The gestures may be preprogrammed into the controller circuit 20, or may be user configurable. That is, the occupant 10 may define the gestures associated with the desired command and store the gestures in the memory of the controller circuit 20. In another example, the input device 28 is a touch pad or a touch screen indicating a menu of options for modifying the aspects of the selected feature 22B. In the examples shown in FIGS. 4-5, the input device 28 is a voice recognition device and is illustrated by a microphone. In this example, the occupants' 10 spoken command is detected by the microphone and transmitted to the controller circuit 20 to execute the command. In this example, the occupants' 10 spoken command may be "MOVE", or other spoken command indicative of the desire to change the position of the selected feature 22B. In an example, the spoken commands are preprogrammed into the controller circuit 20. In another example, the spoken commands are user configurable. In another example, the spoken commands are learned by the controller circuit 20 using a machine learning algorithm that may be stored in the memory of the controller circuit 20.

Step 206, DETECT SECOND GAZE, includes detecting, with the sensor 16, a second gaze 18B directed to a second location on the one or more vehicle displays 14. In the example illustrated in FIG. 4, the second gaze 18B is indicated by another dashed line surrounding the second location on the console display 14B to the right side of the steering wheel 24. The second gaze 18B is determined when a subsequent pause interval is detected by the controller circuit 20 following the detection of the first gaze 18A. In an example, the controller circuit 20 determines the second gaze 18B within a defined period of time (i.e. a time threshold) after the determination of the first gaze 18A. In this example, if the time threshold is exceeded without the detection of the second gaze 18B, the controller circuit 20 interprets the delay as the occupant 10 no longer desiring to adjust the selected feature 22B, and may suspend and/or end the operation. In an example, the time threshold is user defined, and is a static threshold with a value between 0.5 and 10 seconds. In another example, the time threshold is a dynamic threshold that is adjustable based on the environment and/or traffic conditions. In this example, the controller circuit 20 may increase the time threshold when the vehicle is operating in heavy traffic and/or severe weather, when the operator 10 of the vehicle may need to look back at the roadway between the first gaze 18A and the second gaze 18B.

In an example, the controller circuit 20 indicates to the occupant 10 that the occupant 10 has selected the second location in which to move the selected feature 22B based on the second gaze 18B. In an example, the controller circuit 20 indicates the second location by highlighting an area associated with the second gaze 18B that matches the size of the selected feature 22B. In another example, the controller circuit 20 indicates the second location by duplicating an image of the selected feature 22B at the second location. The controller circuit 20 may enhance the duplicate image by pulsing a brightness, a color, or other aspect of the duplicate image to differentiate the duplicate image from the original image.

In an example, the controller circuit 20 requests a confirmation of the selection of the second location from the occupant 10. In this example, if the occupant 10 does not confirm the selection of the second location within a predetermined time period, the controller may suspend and/or end the operation leaving the selected feature 22B at the first location. In an example, the controller circuit 20 requests the confirmation via a video message displayed on the at least one vehicle display 14 prompting the operator 10 select a button or pad. In another example, the controller circuit 20 requests the confirmation via a gesture that is recognized by the gesture recognition device. In another example, the controller circuit 20 requests the confirmation of the selection via an audio message prompting the operator 10 for a verbal response.

Step 208, ADJUST ASPECT OF FEATURE, includes adjusting, with the controller circuit 20, the at least one aspect of the at least one feature 22 based on the received user input. In the example illustrated in FIG. 5, the controller circuit 20 adjusts the location of the selected feature 22B from the first location to the second location. In this example, the controller circuit resizes the navigation information displayed on the console display 14B to make room for the icon. In another example, the controller circuit 20 overlays the icon on the navigation information. In the examples illustrated in FIGS. 4-5, the first location and the second location are on a different vehicle displays 14. In another example, the first location and the second location are on a same vehicle display 14. In an example, the controller circuit 20 stores the layout with the selected feature 22B at the second location in the memory for later use by the occupant 10, as described above.

While the examples used to illustrate the method 200 focused on the icon that was not obstructed from view of the occupant 10, it will be appreciated that the method 200 may also be applied to adjusting an aspect of the partially obstructed features 22A.

Accordingly, a method 100, 200 of displaying features 22 on a vehicle display 14 are provided. The method 100, 200 is an improvement over other methods because the method 100, 200 enables a user to customize the at least one vehicle displays 14 to meet their personal needs.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

CLAUSES

1. A display method, said method comprising:
    detecting, with a sensor, a gaze of an occupant of a vehicle, wherein the gaze is directed to at least one vehicle displays;
    determining, with a controller circuit in communication with the sensor and the at least one vehicle displays, whether one or more features presented on the at least one vehicle displays are at least partially obstructed from a view of the occupant;
    in accordance with the determination that the one or more features presented on the at least one vehicle displays are at least partially obstructed from the view of the occupant;
    adjusting, with the controller circuit, a presentation of at least one partially obstructed features to be viewable by the occupant.

2. The method of clause 1, wherein the sensor is a camera.

3. The method of any one of the preceding clauses, wherein the at least one vehicle displays are located on one of an instrument panel, a console, a dashboard, a windshield, a window, and a mirror.

4. The method of any one of the preceding clauses, wherein the step of adjusting the presentation includes adjusting, with the controller circuit, a position of the at least one partially obstructed features on the at least one vehicle displays.

5. The method of clause 4, further including the step of adjusting, with the controller circuit, the position of all features on the at least one vehicle displays.

6. The method of any one of the preceding clauses, wherein the step of adjusting the presentation includes moving, with the controller circuit, the at least one partially obstructed features to another of the at least one vehicle displays.

7. The method of any one of the preceding clauses, wherein the step of adjusting the presentation includes adjusting, with the controller circuit, a dimension of the at least one partially obstructed features on the at least one vehicle displays.

8. The method of clause 7, further including the step of adjusting, with the controller circuit, the dimension of all features presented on the at least one vehicle displays.

9. The method of any one of the preceding clauses, wherein the at least one partially obstructed features include one of a gage, an icon, an infotainment feature, and a camera image.

10. The method of any one of the preceding clauses, wherein the system further includes a memory, further including the step of storing, with the controller circuit, the adjusted presentation of the at least one vehicle displays in the memory.

11. A display method, said method comprising:
    detecting, with a sensor, a first gaze directed to at least one feature presented via one or more vehicle displays;
    receiving, with an input device, a user input indicating that a user seeks to modify at least one aspect associated with the at least one feature; and in response to the received user input, adjusting, with a controller circuit in communication with the sensor, the one or more vehicle displays, and the input device, the at least one aspect of the at least one feature.

12. The method of clause 11, wherein the at least one feature is presented at a first location on the one or more vehicle displays;

wherein a first user input indicates that the user seeks to modify a location of the at least one feature presented on the one or more vehicle displays; and further comprising the steps of:

detecting, with the sensor, a second gaze directed to a second location on the one or more vehicle displays; and in response to detecting the second gaze, adjusting the location of the at least one feature from the first location to the second location.

13. The method of clause 12, wherein the first location and the second location are on a same vehicle display.

14. The method of any one of the preceding clauses 12 to 13, wherein the first location and the second location are on a different vehicle display.

15. The method of any one of the preceding clauses 12 to 14, wherein the system further includes a memory, further including the step of storing, with the controller circuit, the location of the adjusted feature in the memory.

16. The method of any one of the preceding clauses 11 to 15, wherein the input device includes one of a voice recognition device, a gesture recognition device, a touch pad, and a touch screen.

17. The method of any one of the preceding clauses 11 to 16, wherein the at least one aspect includes one of a dimension, a color, a contrast, a depth, a font, and a brightness.

18. The method of any one of the preceding clauses 11 to 17, wherein the at least one feature includes one of a gage, an icon, an infotainment feature, and a camera image.

19. The method of any one of the preceding clauses 11 to 18, wherein the sensor is a camera.

20. The method of any one of the preceding clauses 11 to 19, wherein the one or more vehicle displays are located on one of an instrument panel, a console, a dashboard, a windshield, a window, and a mirror.

We claim:

1. A method comprising:
   determining, with a controller circuit in communication with a sensor of a vehicle and at least one vehicle display, whether one or more features presented on the at least one vehicle display are at least partially obstructed from a view of an occupant of the vehicle, the sensor being configured to detect a gaze of the occupant directed to the at least one vehicle display; and
   in accordance with the determination that the one or more features presented on the at least one vehicle display are at least partially obstructed from the view of the occupant;
      adjusting, with the controller circuit, a presentation of at least one partially obstructed feature to be viewable by the occupant
      storing, with the controller circuit, an indication of the adjusted presentation of the at least one vehicle display in a memory; and
      restoring, from the memory and based on the indication of the adjusted presentation, the adjusted presentation of the at least one vehicle display upon detecting that the occupant reentered the vehicle.

2. The method of claim 1, wherein the sensor is an infrared or near-infrared camera.

3. The method of claim 1, wherein the at least one vehicle display is located on one of an instrument panel, a console, a dashboard, a windshield, a window, and a mirror.

4. The method of claim 1, wherein the step of adjusting the presentation includes adjusting, with the controller circuit, a position of at least one partially obstructed feature on the at least one vehicle display.

5. The method of claim 4, the method further comprising adjusting, with the controller circuit, a position of all features on the at least one vehicle display.

6. The method of claim 1, wherein the step of adjusting the presentation includes moving, with the controller circuit, at least one partially obstructed feature to another vehicle display.

7. The method of claim 1, wherein the step of adjusting the presentation includes adjusting, with the controller circuit, a dimension of at least one partially obstructed feature on the at least one vehicle display.

8. The method of claim 7, the method further comprising adjusting, with the controller circuit, a dimension of all features presented on the at least one vehicle display.

9. The method of claim 1, wherein at least one partially obstructed feature includes one of a gage, an icon, an infotainment feature, and a camera image.

10. The method of claim 1, wherein the step of restoring the adjusted presentation of the at least one vehicle display is activated by an automatic seat adjustment routine associated with the occupant.

11. The method of claim 2, wherein the step of detecting the gaze of the occupant comprises:
   capturing, by the infrared or near-infrared camera, a sequence of images including eyes of the occupant; and
   processing, by the controller circuit, the sequence of images to determine whether the eyes of the occupant remain directed at a same feature on the at least one vehicle display for a pause interval.

12. The method of claim 11, wherein the pause interval is a variable time based on a number of the one or more features presented on the at least one vehicle display.

13. A system comprising:
   a sensor configured to detect a gaze of an occupant of a vehicle, wherein the gaze is directed to at least one vehicle display; and
   a controller circuit operably connected to the sensor and the at least one vehicle display, the controller circuit configured to:
      determine whether one or more features presented on the at least one vehicle display are at least partially obstructed from a view of the occupant; and
      responsive to a determination that the one or more features presented on the at least one vehicle display are at least partially obstructed from the view of the occupant:
         adjust a presentation of at least one partially obstructed feature to be viewable by the occupant;
         store an indication of the adjusted presentation of the at least one vehicle display in a memory; and
         restore, from the memory and based on the indication of the adjusted presentation, the adjusted presentation of the at least one vehicle display upon a detection that the occupant reentered the vehicle.

14. The system of claim 13, wherein the sensor is an infrared or near-infrared camera.

15. The system of claim 13, wherein the controller circuit is further configured to, in adjusting the presentation, to adjust a position of at least one partially obstructed feature on the at least one vehicle display.

16. The system of claim 13, wherein the controller circuit is further configured to, in adjusting the presentation, move at least one partially obstructed feature to another display of the at least one vehicle display.

17. The system of claim 13, wherein the controller circuit is further configured to, in adjusting the presentation, adjust a dimension of at least one partially obstructed feature on the at least one vehicle display.

18. The system of claim 13, wherein the restoration of the adjusted presentation of the at least one vehicle display is activated by an automatic seat adjustment routine associated with the occupant.

19. The system of claim 14, wherein the controller circuit is further configured to, in detecting the gaze of the occupant comprises:
 cause the infrared or near-infrared camera to capture a sequence of images including eyes of the occupant; and
 process the sequence of images to determine whether the eyes of the occupant remain directed at a same feature on the at least one vehicle display for a pause interval.

20. The system of claim 19, wherein the pause interval is a variable time based on a number of the one or more features presented on the at least one vehicle display.

\* \* \* \* \*

UNITED STATES PATENT AND TRADEMARK OFFICE
CERTIFICATE OF CORRECTION

PATENT NO. : 10,852,822 B2
APPLICATION NO. : 16/400244
DATED : December 1, 2020
INVENTOR(S) : Heather L. Beineke, Douglas A. Srail and Mark A. Kady Page 1 of 1

It is certified that error appears in the above-identified patent and that said Letters Patent is hereby corrected as shown below:

In the Claims

Column 9, Lines 58 and 59, after "the" before "storing," delete "occupant" insert --occupant;--

Signed and Sealed this
Twenty-ninth Day of December, 2020

Andrei Iancu
*Director of the United States Patent and Trademark Office*